Nov. 28, 1967  M. TIŠNOVSKÝ  3,354,640
HYDRAULIC PRESSURE-MULTIPLIER
Filed May 19, 1966  9 Sheets-Sheet 1

Miroslav Tišnovský
INVENTOR.
By Richard Low ag't

Fig. 3

Nov. 28, 1967     M. TIŠNOVSKÝ     3,354,640

HYDRAULIC PRESSURE-MULTIPLIER

Filed May 19, 1966     9 Sheets-Sheet 4

Fig. 4

Miroslav Tišnovský
INVENTOR.

By Richard ...
ag't

United States Patent Office 3,354,640
Patented Nov. 28, 1967

3,354,640
HYDRAULIC PRESSURE-MULTIPLIER
Miroslav Tišnovský, Prague, Czechoslovakia, assignor to Naradi, narodni podnik, Prague, Czechoslovakia
Filed May 19, 1966, Ser. No. 551,863
Claims priority, application Czechoslovakia,
May 20, 1965, 3,290/65
10 Claims. (Cl. 60—54.5)

The present invention relates to hydraulic pressure-multipliers.

More particularly, the present invention relates to hydraulic pressure-multipliers capable of being actuated either hydraulically or pneumatically.

Pressure-multipliers of this type are actuated either hydraulically or pneumatically for the purpose of operating a hydraulic device used, for example, to grip a workpiece which is worked on in a suitable machine.

Pressure-multipliers of conventional construction customarily include a pair of operating cylinders arranged one after the other and respectively cooperating with pistons of different diameters. These pistons have a common piston rod, the larger of the pistons being actuated with a relatively small fluid pressure while a correspondingly greater liquid pressure is achieved in the smaller of the operating cylinders. Structures of this type, used for multiplying the liquid pressure, have primarily the disadvantage of being unavoidably of relatively large size, so that they are impractical for many purposes and moreover are only capable of supplying a relatively small amount of liquid at high pressure. Moreover, these conventional structures are not reliable in operation, so that they result in unavoidable interruptions in the supply of the hydraulic fluid under pressure. Moreover, with conventional constructions there is very frequently no possibility of a simple, automatic prefilling of the low pressure circuit.

It is accordingly a primary object of the present invention to provide a pressure-multiplier which will avoid the above drawbacks.

In particular, it is an object of the present invention to provide a hydraulic pressure-multiplier which is of an exceedingly compact construction so that it does not require the parts to be of an undesirably large and impractical size.

Moreover, it is an object of the present invention to provide a pressure-multiplier which is double-acting, so that the supply of high-pressure liquid can take place during both directions of movement of a low pressure piston, whose reciprocation is capable of being automatically controlled, in accordance with a further object of the present invention.

Yet another object of the present invention is to provide a pressure-multiplier of the above type which operates very quickly during the initial phase of the operations, when the device is started, so as to automatically prefill the low pressure circuit providing a supply of pressure liquid into the high pressure circuit directly at the beginning of the operations, thus achieving a practical and economical use of the energy supplied during the initial part of the operation.

It is furthermore an object of the present invention to provide a construction of the above type which will maintain the high pressure of the liquid at the device which is actuated by the pressure-multiplier, even if there should be a drop in pressure in the supply of liquid from the low pressure circuit.

Also, it is an object of the invention to provide a pressure-multiplier capable of deriving the liquid for the high pressure circuit directly from the low pressure circuit, while providing for both circuits a common low-pressure return-flow conduit.

Furthermore, it is an object of the present invention to provide, for an arrangement where the hydraulic pressure-multiplier is pneumatically actuated, a relatively small container, for the hydraulic liquid, communicating with the high pressure circuit.

Further, objects of the present invention include the provision of a structure capable of automatically maintaining the high pressure at a preselected value and for any desired length of time, with an interruption in the operation of the pressure-multiplier and in the consumption of low-pressure fluid when the predetermined high pressure of the hydraulic circuit is achieved.

In accordance with the present invention the high pressure cylinder of the pressure-multiplier of the invention is defined by the interior of a double-acting low-pressure piston means which, in the case where the structure is pneumatically actuated, has a pair of independent piston portions for the purpose of increasing the effective operating areas subjected to the gas pressure. Furthermore, with the structure of the invention while the high pressure piston means is also double-acting, it is stationary and is situated in the high pressure cylinder or chamber formed in the interior of the low pressure piston means. The high-pressure piston means is formed with a passage through which the high pressure liquid is conveyed and with which a non-return valve means coacts to prevent a pressure drop at the device to which the high pressure liquid is delivered. The structure of the invention furthermore includes a pair of additional non-return valve means one of which participates in the double-acting operation of the high pressure piston means and the second of which participates in the filling of the high pressure chamber formed in the interior of the low pressure piston means. All of these non-return valve means of the structure of the invention participate in the prefilling of the high pressure circuit.

The structure of the invention also includes primary and secondary slide valve means built directly into the body of the structure with the primary slide valve means controlling the flow of low pressure fluid to the opposite ends of the low pressure piston means while the secondary slide valve means actuates the primary slide valve means, this secondary slide valve means being automatically shifted by a reversing means of the invention which is actuated automatically in response to movement of the low pressure piston means.

Moreover, in accordance with the present invention, in order to achieve the continuous double-acting operation of the high pressure piston means, so as to provide a flow of the high pressure liquid without variations in the resulting pressure, the effective operating areas of both the low pressure and high pressure cylinders are maintained at a substantially constant ratio with respect to each other, this ratio being maintained within plus or minus 10%.

The invention is illustrated by way of example in the accompanying drawings which show two embodiments of the present invention and in which.

Figures 1, 6:
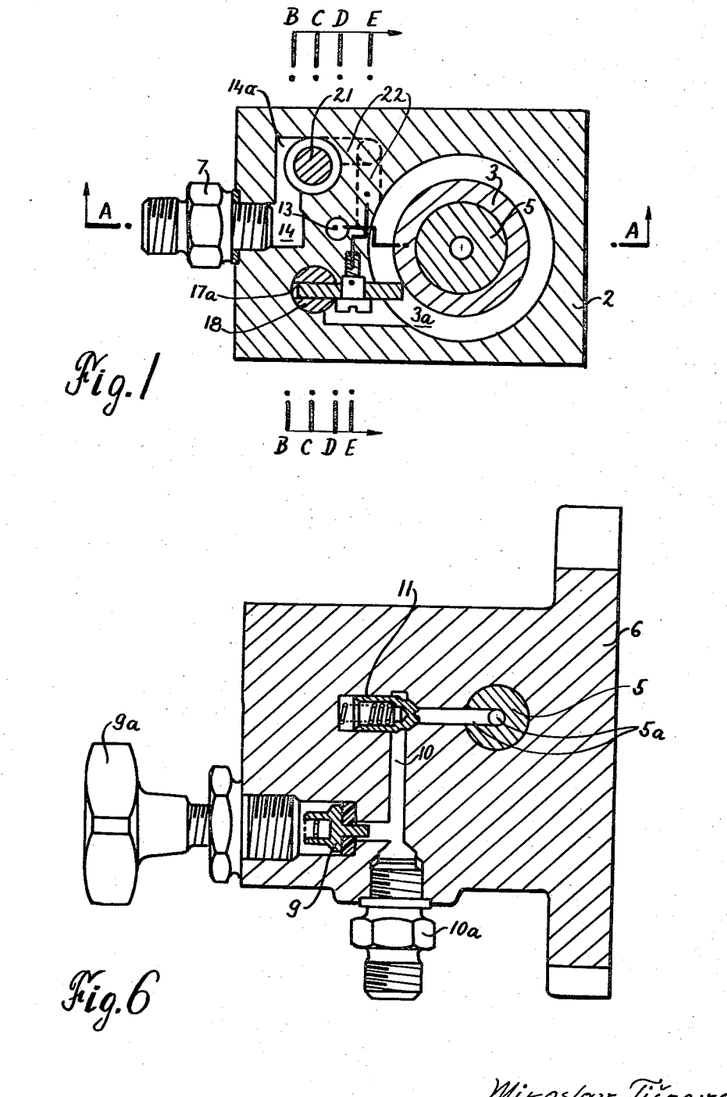
FIG. 1 shows one possible construction of a hydraulic pressure-multiplier of the invention in a transverse cross-sectional view taken in a substantially central plane where the supply conduit for the actuating fluid is situated.
FIG. 6 is a transverse section of the structure at the region of one end of the apparatus taken along line F—F of FIG. 2.
Figure 2:
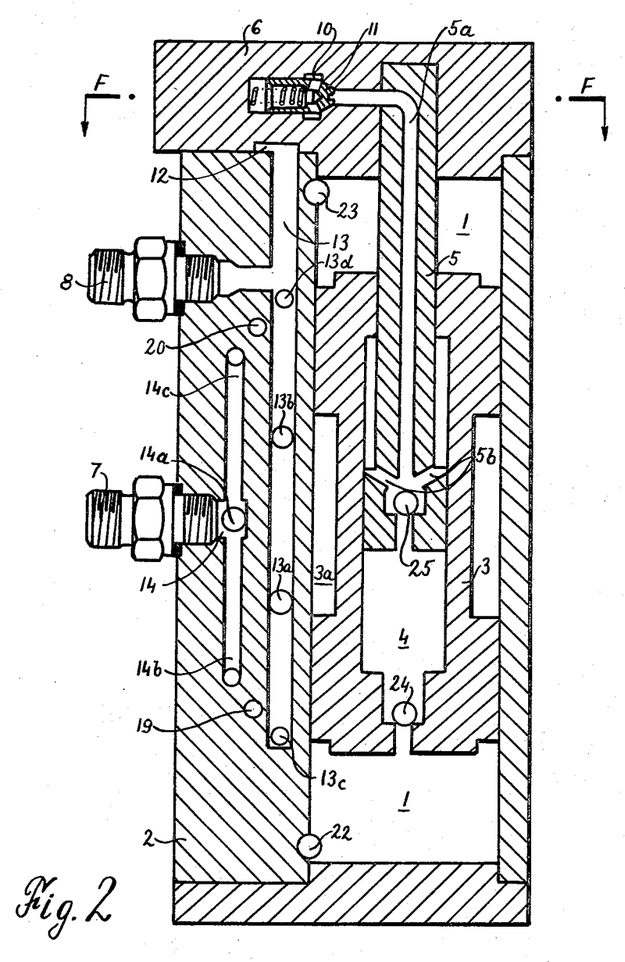
FIG. 2 is a longitudinal sectional illustration of the structure of FIG. 1 taken along line A—A of FIG. 1.

Referring now to FIGS. 1-6, and in particular to FIGS. 1 and 2, it will be seen that the illustrated embodiment includes an outer body 2 which defines in its interior a low pressure cylinder means 1 of the hydraulic pressure-multiplier. Within this low pressure cylinder 1 a low pressure piston means 3 is situated for reciprocating movement, and the interior of the low pressure piston means 3 is hollow so as to define a high pressure cylindrical chamber 4. The structure of the invention includes a stationary high pressure piston means 5 which is fixedly carried by the low pressure cylinder means and which extends into the high pressure piston means 5 during reciprocation of the low pressure piston means 3. This double-acting high pressure piston means 5 is fixedly carried by the upper head end member 6. This member 6 serves at the same time to mount the pressure-multiplier of the invention on a machine frame.

As is apparent from FIGS. 1 and 2, the body 2 carries an inlet conduit 7 communicating with a reservoir of hydraulic liquid through a low pressure pump and by way of an unillustrated conduit. A low-pressure return-flow conduit 8 (FIG. 2) is also connected with the body 2, this return-flow conduit communicating in an unillustrated manner with the reservoir of hydraulic liquid from which is derived the liquid supplied by the low pressure pump to the conduit 7. Thus, the actuating liquid returns to the reservoir through the low-pressure return-flow conduit 8.

The high pressure piston means 5 communicates through an interior passage 5a thereof with a high pressure passage 10 leading through a conduit 10a (FIG. 6) to the device which is to be hydraulically actuated, such as a hydraulic gripping device capable of gripping a workpiece. As is also shown in FIG. 6, an unloading valve 9 communicates with the discharge passage 10 for the high pressure liquid, and this unloading valve 9 serves to direct the high pressure liquid away from the interior of the discharge conduit 10. A non-return valve means 11 (FIG. 6) is situated in the discharge conduit 10 upstream of the unloading valve 9 for permitting the liquid under pressure to flow from the passage 5a past the valve 11 and through the conduit 10a to the gripping device or the like, while preventing a flow of high pressure liquid in reverse direction.

The unloading valve 9 is capable of being manually actuated by way of a handle 9a which is accessible at the exterior of the body 2. When the operator actuates the handle 9a for opening the valve 9, the high pressure liquid situated downstream of the valve 11 in the conduit 10 between the valve 11 and the valve 9 can flow through the valve 9 into a passage 12 (FIG. 3) which communicates with a low pressure return-flow conduit 13 formed by a passage in the body 2, so that the manual opening of the valve 9 serves to direct the high pressure fluid from the passage 10, downstream of the non-return valve 11, back into the low pressure return flow conduit 13 to flow from the latter through the conduit 8 back to the reservoir.

Figure 3:
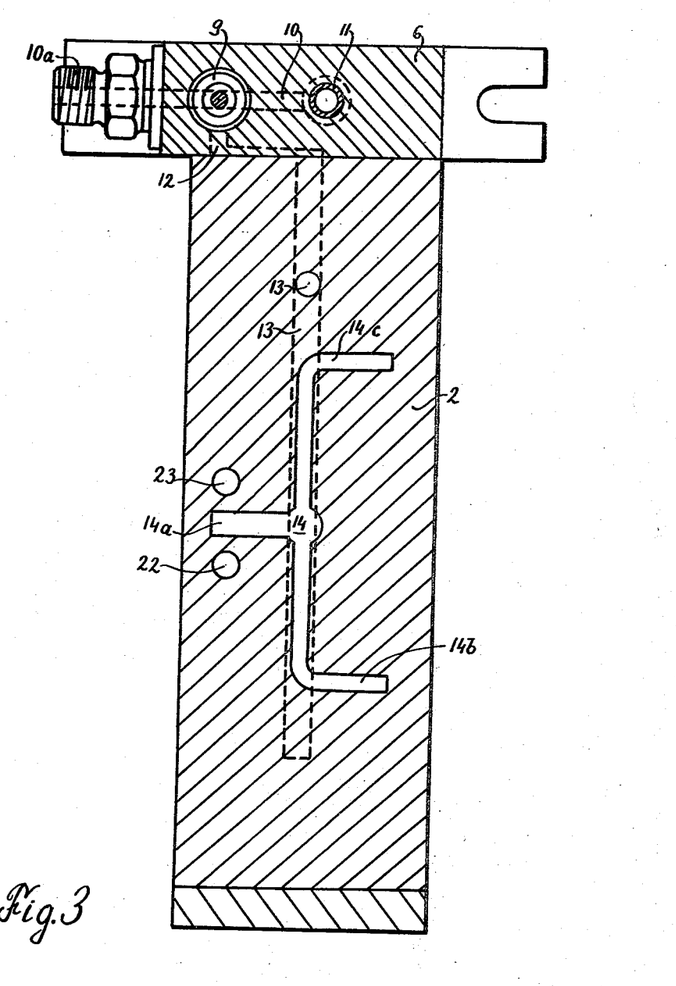
FIG. 3 is a longitudinal section of the structure of FIG. 1 taken along line B—B of FIG. 1.
Figure 4:
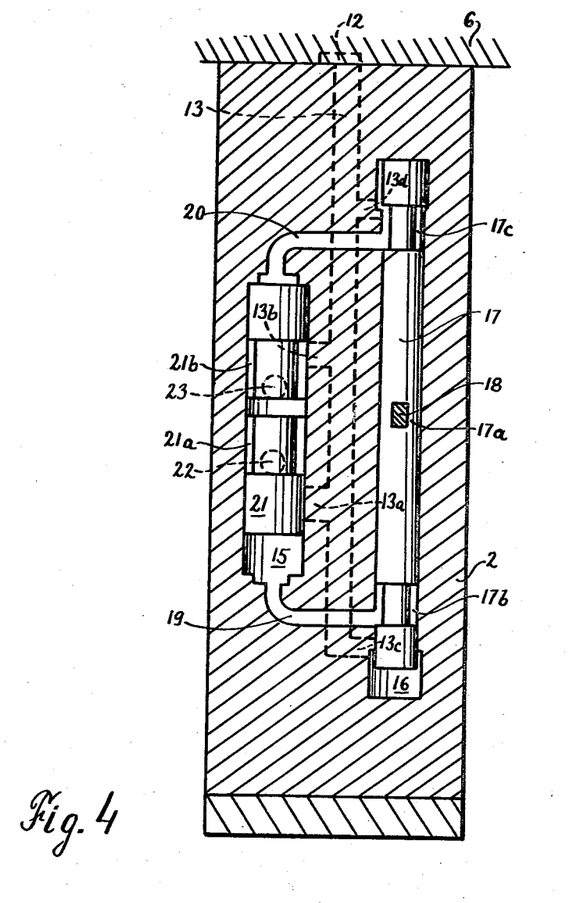
FIG. 4 is a longitudinal section of the structure of FIG. 1 taken along line C—C of FIG. 1, with the dotted line passages of FIG. 4 taken in a longitudinal plane along line D—D of FIG. 1.

The supply conduit 7 for the hydraulic actuating liquid communicates with an inlet passage 14 formed in the body 2 and having a plurality of branches. Thus, the branch 14a (FIGS. 1-3) communicates with the pair of additional branches 14b and 14c, these latter branches communicating with a cylindrical chamber 16 while the branch 14a communicates with a cylindrical chamber 15 (FIG. 4). Within the chamber 16 is a reciprocating secondary slide valve means 17.

The secondary slide valve means 17 is formed at a central portion with an opening 17a which receives one arm of a lever 18. The lever 18 forms part of a reversing means for automatically reversing the slide valve 17 in response to movement of the low-pressure piston means 3, when the latter reaches the ends of its strokes. As may be seen from FIG. 1, the lever 18 is supported for turning movement intermediate its ends, and distant from the opening 17a the lever 18 has an arm which is received in an annular elongated groove 3a formed at the exterior side surface of the piston 3 midway between the ends thereof. This groove terminates in a pair of annular shoulders which respectively engage and turn the lever 18 at the ends of the strokes of the piston 3 to automatically reciprocate the slide valve means 17.

As may be seen from FIG. 4, the slide valve 17 is formed in the region of one of its ends with an annular elongated groove 17b which communicates through a passage 19 with the lower end of the cylindrical chamber 15, so that in this way the chambers 15 and 16 communicate with each other. In the region of its upper end the slide valve 17 is formed with an additionally elongated annular groove 17c which communicates through a passage 20 with the upper end of the chamber 15, thus providing communication between the upper end portions of the chambers 15 and 16.

Figure 5:
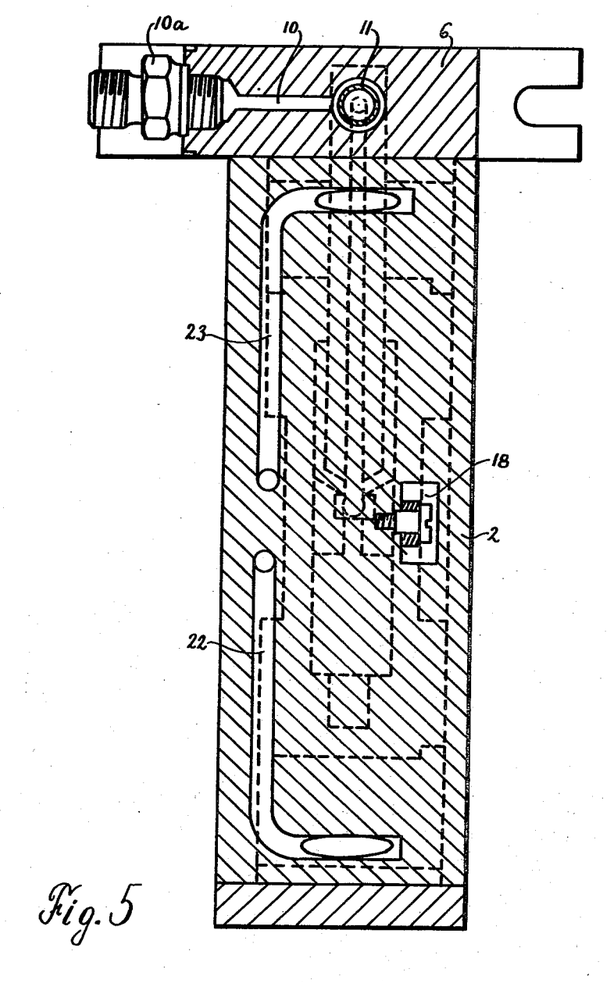
FIG. 5 is a longitudinal section taken along line E—E of FIG. 1.

Slidably supported in the chamber 15 is a primary slide valve means 21 which is capable of reciprocating in the chamber 15 and which is controlled by flow of fluid through the passages 19 and 20 in response to shifting of the secondary slide valve means 17. As is shown in FIGS. 2, 3, and 5, the body 2 is formed with passages 22 and 23 which communicate with chamber 15, the passage 22 leading from the chamber 15 to the lower portion of the low pressure cylinder chamber 1 for filling and emptying the latter. The passage 23 leads to the upper portion of the low pressure cylinder chamber 1 to communicate with the upper end of the low pressure piston means 3, so that fluid also flows to and from the top end of the piston 3 from the chamber 15 through the passage 23. As is apparent from FIG. 4, these passages 22 and 23 communicate with elongated annular grooves 21a and 21b which are respectively formed in the primary slide valve means 21.

Depending upon the position of the slide-valve means 21, one or the other of the passages 22 and 23 will be in communication with the branch 14a of the supply passage 14 for the actuating liquid. That one of the grooves 21a and 21b which at any given instant is not in communication with the branch 14a is in communication with the return-flow passage 13, so that during reciprocation of slide valve 21 between its positions the upper and lower ends of the low pressure cylinder chamber are alternately placed in communication with supply liquid and with the low pressure return. For this purpose, it will be noted, the low pressure return-flow passage 13 has a pair of branches 13a and 13b (FIGS. 2 and 4) which communicate with the chamber 15. Thus, in the upper position of the valve 21, shown in FIG. 4, it is its lower groove 21a which communicates with the branch 14a and through the passage 22 with the lower end of the low pressure piston means 3 so as to raise the latter upwardly, while the upper end of the piston means 3 at this time communicates through the passage 23 with the elongated groove 21b which, as shown in FIG. 4, communicates at this time through branch 13b with the low pressure return conduit 13. In the lower position of the valve 21, the actuating liquid will flow from the branch 14a through the groove 21b into the passage 23 to the top end of the piston 3 while the bottom end of the latter will communicate through the passage 22 with the lower branch 13a of the low pressure return flow conduit 13.

As is shown in FIG. 2, the lower end of the low pressure piston means 3 is provided with a non-return valve 24 through which the high pressure chamber 4 communicates with the lower end of the cylindrical interior of the low pressure cylinder means. Thus, the low pressure liquid will flow through the valve 24 into the high pressure chamber 4. The hydraulic liquid will in this way reach the lower end portion of the high pressure chamber 4 in the interior of the low pressure piston means 3.

The lower end of the high pressure piston means 5 is provided also with a non-return valve 25 which serves to provide for a flow of high pressure liquid into the passage in the interior of the high pressure piston means 5 while preventing a flow of the high pressure fluid in the reverse direction. Thus, from the lower end of the high pressure chamber 4, the high pressure fluid can flow through the non-return valve 25 not only into the passage 5a but also through the branches 5b which are formed in the high pressure piston means 5 downstream of the valve 25 and which communicates with the upper portion of the high pressure chamber 4 where this upper portion surrounds the portion of the high pressure piston means 5 which is of a smaller diameter and which does not slidably engage the inner cylindrical surface of the low pressure piston means 3. The liquid which flows upwardly through the passage 5a reaches the head end 6 of the apparatus and of course can flow through the non-return valve 11 to the discharge conduit 10 in order to supply the latter with high pressure liquid. The relatively small passages 5b intersect the passage 5a just downstream of the non-return valve 25 and provide communication between the interior of the piston means 5 and the upper part of the high pressure chamber 4.

The manner in which the low-pressure return-flow passage 13 communicates with the upper and lower ends of the low pressure cylinder chamber 1 alternately through the passages 22 and 23 and the elongated annular grooves 21a and 21b of the primary slide valve 21 has been described above. This low-pressure return-flow passage 13 also has branches 13c and 13d (FIGS. 2 and 4) capable of alternately communicating with the elongated grooves 17b and 17c of the secondary slide valve 17 so as to provide communication at these grooves alternately with the passages 19 and 20. Therefore, through these latter passages the opposite ends of the chamber 15 will alternately communicate with the low pressure return-flow conduit 13, depending upon the position of the secondary slide valve 17. In the position thereof shown in FIG. 4, it is the upper end of the passage 15 which communicates through the passage 20 with the branch 13d at the elongated groove 17c of the slide valve 17. When the latter has been displaced to its lower position, through automatic actuation of the reversing means 18, the lower end of the chamber 15 will communicate through the passage 19 and the branch 13c, by way of the groove 17b, with the return-flow passage 13. The liquid from the return flow passage 13 flows through the conduit 8 back to the reservoir, as pointed out above.

The hydraulic-multiplier of the present invention, described above, operates in the following manner:

The low pressure liquid is supplied by a pump to the conduit 7 so as to reach the entrance passage 14. The actuating liquid flows along the branch 14a and from the latter into the elongated annular groove 21a of the primary slide valve 21, with the position of the parts shown in FIG. 4. Through this groove the actuating liquid will reach the passage 22 so as to flow through this passage from the chamber 15 into the lower part of the low pressure cylinder 1 so as to engage the bottom end of the low pressure piston means 3 and drive the latter upwardly. In this way the operation of the low pressure piston means 3 is initiated, and the low pressure return, which may handle air at the beginning of the operations, takes place from the upper part of the low pressure chamber 1 through the passage 23 into the elongated groove 21b of the primary valve 21 which is in the chamber 15. This low pressure return path continues from the groove 21b through the branch 13b into the low pressure return-flow passage 13 from where the liquid returns through the conduit 8 back to the reservoir.

As the piston 3 reaches the end of its upward stroke, it will engage and swing the reversing lever 18 so that this lever 18 will now displace the secondary valve 17 downwardly from the position thereof shown in FIG. 4. As a result the elongated annular groove 17c comes into communication with the branch 14c of the entrance passage through which the low pressure actuating liquid flows to the passage 20 which by reason of the downward displacement of the valve 17 no longer communicates with the return-flow passage 13. The actuating liquid will thus reach the top end of the primary slide valve 21 to displace the latter downwardly from the position shown in FIG. 4, and at the same time the elongated groove 17b of the secondary slide valve has placed the passage 19 in communication with the return-flow passage 13 while cutting off communication between the passage 19 and the supply branch 14b for the low pressure actuating liquid. In this way the fluid will flow from the bottom end of chamber 15 back to the reservoir.

Thus, the downward displacement of the primary slide valve 21 from its position shown in FIG. 4 has resulted, on the one hand, in terminating the flow of low pressure liquid to the lower end of the low pressure cylinder 1 so as to terminate the upward movement of the piston 3, and since the supply branch 14a now communicates at the enlongated groove 21b with the passage 23, the actuating liquid flows through the latter passage to the top end of the cylinder 1 so as to drive the piston 3 back down. Therefore, a complete reversal of the operations has taken place with the fluid flowing in the reverse direction and all movable parts having been displaced to their other positions. (The operations now take place, for the return flow, through the groove 21a and passage 22 which now communicates through the branch 13a with the return-flow passage 13, and instead of supplying pressure liquid through the passage 19 it is supplied through the passage 20, while at the same time it is the branch 13b which is closed by the valve 21 instead of the branch 13a of the low pressure return-flow conduit, and branch 13c is now opened instead of the branch 13d, etc.).

As a result of the downward displacement of the low pressure piston means 3, the liquid in the lower end of the low pressure cylinder 1 opens the valve 24 and enters into the high pressure chamber 4, and when the piston 3 has completed its downward stroke, the entire high pressure chamber 4 has become filled with liquid. On the other hand, within the high pressure chamber 4 as a result of the simultaneous reduction in the volume of the portion thereof which surrounds the high pressure piston 5, above the piston portion thereof of larger diameter, the liquid is under pressure in the upper part of the high pressure chamber 4 and acts on the valve 25 to maintain the latter closed, the flow now taking place through the branches 5b and into the passage 5a along the interior of the high pressure piston means 5, so that in this way the high pressure liquid will reach the non-return valve 11 to automatically open the latter and to enter into the discharge conduit 10.

As soon as the low pressure piston 3 again starts to move upwardly, the lower end of the high pressure chamber 4 approaches the high pressure piston 5, and as a result of the increase in pressure of the liquid at this time in the lower portion of the high pressure chamber 4, the non-return valve 24 becomes closed and the non-return valve 25 opens and a part of the liquid which is thus placed at a high pressure in the lower part of the high pressure chamber 4 now will flow through the passage 5a to the non-return valve 11 which is again opened by this fluid under pressure, which thus reaches the discharge conduit 10, while another portion of the fluid flowing out of the lower part of the high pressure chamber 4 will pass through the branches 5b of the passage 5a into the upper part of the high pressure chamber 4.

As long as the low pressure piston 3 at the beginning of the operation of the pressure-multiplier moves upwardly and there is in the discharge conduit 10 a pressure lower than in the lower part of the low pressure chamber 1, all three valves 24, 25 and 11 will be simultaneously opened, so that a very rapid prefilling of the entire high pressure chamber 4, as well as the passages 5a and 5b and the interior of the discharge conduit 10 will take place, and the hydraulic elements which communicate with the structure of the invention become quickly filled with low pressure hydraulic liquid. As soon as the piston 3 terminates its upward stroke and starts to move downwardly, there will be, for a very short time, a pressure drop in the passage 5a, so that the non-return valve 11 closes, thus preventing a drop in the pressure of the high pressure liquid in the discharge conduit 10. In the upper part of the high pressure chamber 4, however, there will be an immediate and rapid increase in the pressure of the liquid which results in almost immediate closing of the valve 25 and the high pressure from the upper part of the chamber 4 now spreads through the branches 5b and along the passage 5a of the double-acting high pressure piston means 5, so that the non-return valve means 11 becomes again almost immediately opened and the supply of high pressure liquid to the discharge conduit 10 continues. During each subsequent reversal in the direction of movement of the piston 3, there will be the momentary drop in pressure of the high pressure liquid in the passage 5a, so that the valve 11 again closes momentarily. During the further movement of the low pressure piston 3 downwardly, when all of the chambers of the pressure-multiplier are filled with pressure liquid, there will be, as a result of the increase in the volume of the lower portion of the high pressure chamber 4 a drop in pressure of the liquid in the lower part of the high pressure chamber 4, and this action will also serve to close the non-return valve 25 as well as to open the non-return valve 24 through which the liquid flows from the lower part of the low pressure cylinder 1 into the lower part of the high pressure chamber 4 until the end of the downward stroke of the piston 3 during which the liquid is sucked into the bottom part of the low pressure chamber 4. Of course, at the same time liquid in the lower part of the chamber 1 which is not received in the lower part of the high pressure chamber 4 flows back to the reservoir through the passages 22 and 13 in the manner described above.

When a predetermined desired high pressure in the discharge conduit, downstream of the valve 11, has been reached, an equilibrium and pressure equalization will take place on both sides of the non-return valve 11 so that the pressure-multiplier automatically stops operating. As soon as high pressure liquid is no longer required in the conduit 10, or in the hydraulic gripping device or the like to which the hydraulic pressure liquid is delivered, the operator will open the unloading valve 9, by actuating the handle 9a, so that liquid will flow from the conduit 10, downstream of the valve 11, through the discharge passage 12 to the return-flow conduit 13, to again reach the reservoir. In the event that at this time the low pressure pump is still delivering liquid to the supply conduit 7, the pressure-multiplier will again be actuated in the manner described above, and this operation will take place until after closing of the unloading valve 9 the pressure in the discharge conduit 10 again reaches the predetermined magnitude for which the apparatus has been set. This required pressure is achieved by adjustment of the low pressure to a predetermined value.

As has been indicated above, in order to achieve the continuous double-acting operation of the high pressure piston means 5, so as to result in delivery of high pressure liquid without variations in the resulting pressure, one of the features of the invention resides in providing ratios between the effective operating areas of both cylinders which are substantially constant, within a variation which at a maximum is plus or minus 10%. Thus, the cross-sectional effective area of the lower part of the low pressure cylinder 1 has with respect to the cross-sectional area of the piston means 5, at its upper end in the upper portion of the cylinder 1, a ratio which is substantially equal to the ratio of the effective area at the upper end of the low pressure cylinder 1, surrounding the piston 5, with respect to the effective cross-sectional area of the high pressure cylindrical chamber 4. Of course, the upper portions of both cylindrical chambers 1 and 4 are of an anular, ring-shaped configuration having inner peripheral circles which surround and engage the piston 5 at its elongated portion of smaller diameter while the outer circular peripheries of these upper effective area portions of the low and high pressure cylinders are respectively of the same size as and are aligned with the outer circular peripheries of these cylindrical pressure chambers at their lower ends.

Figure 7:
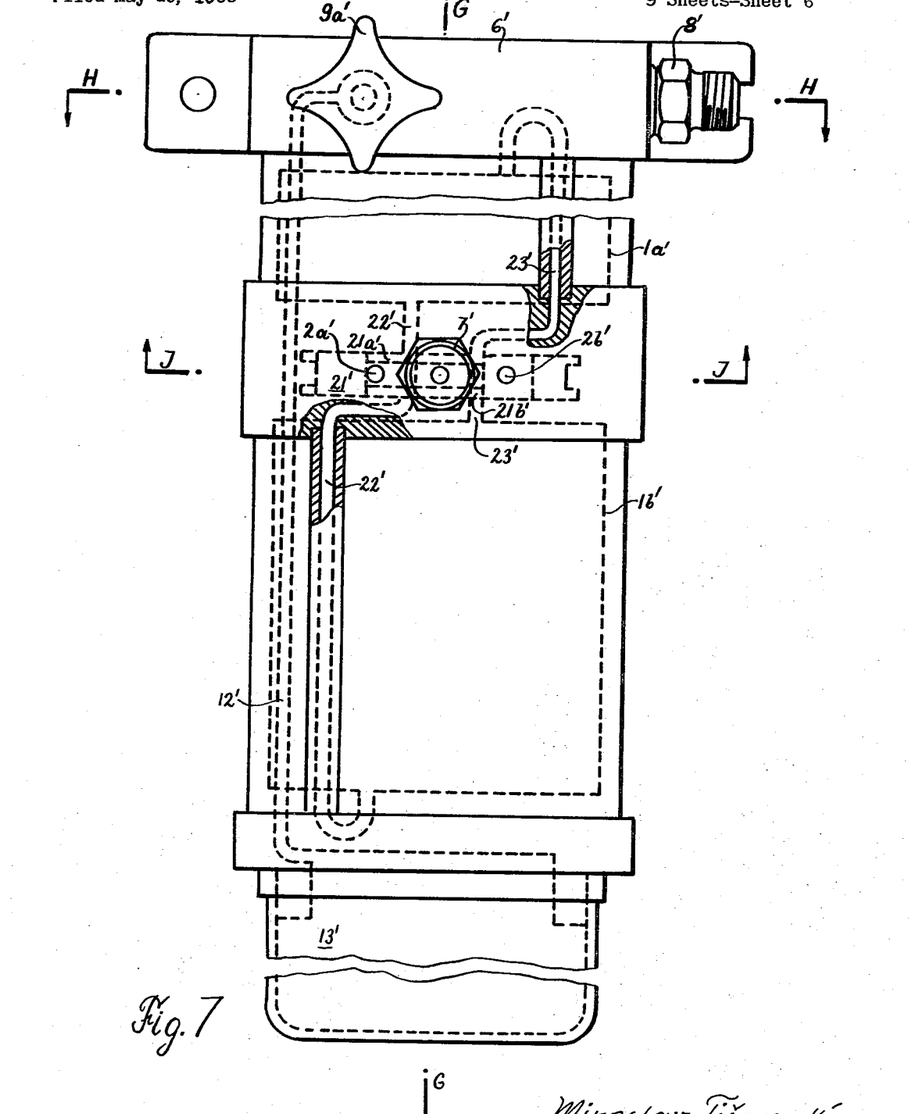
FIG. 7 is a plan view of another embodiment of a hydraulic pressure-multiplier of the invention, this embodiment being pneumatically actuated.
Figure 8:
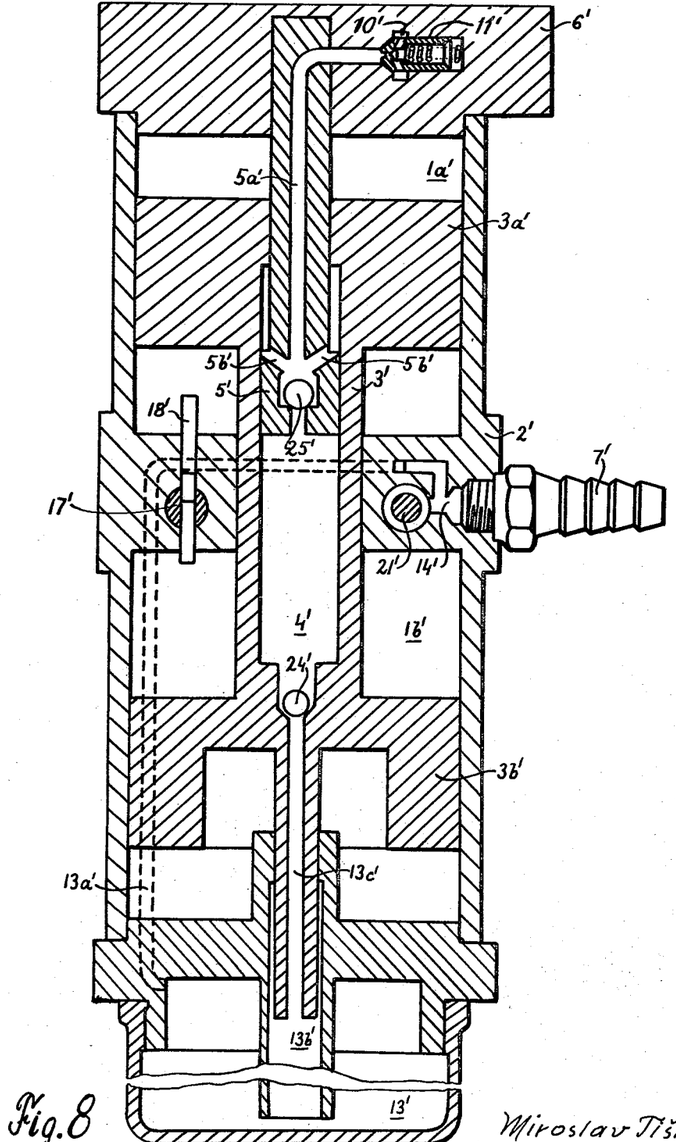
FIG. 8 is a longitudinal section of the structure of FIG. 7, taken along line G—G of FIG. 7.

In the second embodiment of the invention which is illustrated in FIGS. 7–11, the hydraulic pressure-multiplier will also provide hydraulic pressure liquid at the required high pressure, but in this case the structure is pneumatically actuated. In this case the low pressure chamber has a pair of portions 1a' and 1b' which receive air under pressure, these low pressure cylinder portions 1a' and 1b' being formed in the body 2' (FIG. 8). The low pressure piston means of this embodiment includes an upper piston 3a' and a lower piston 3b', these pistons being interconnected by an intermediate piston rod 3' which is hollow and of a smaller diameter than the upper and lower pistons which are respectively slidable in the upper and lower pressure chambers 1a' and 1b'.

The body 2' is formed with an intermediate transverse wall formed with a central opening through which the hollow piston rod 3' slidably extends, this transverse wall serving to separate the upper and lower pneumatic chambers 1a' and 1b' from each other. The hollow interior of the low pressure piston rod 3' forms the high pressure chamber 4' for hydraulic liquid and this high pressure chamber receives the high pressure piston means 5' which is stationary and double-acting and which is fixedly carried by the head end member 6' of this embodiment. This head end member 6' also serves to fix the pressure-multiplier to the frame of the machine.

Figure 10:
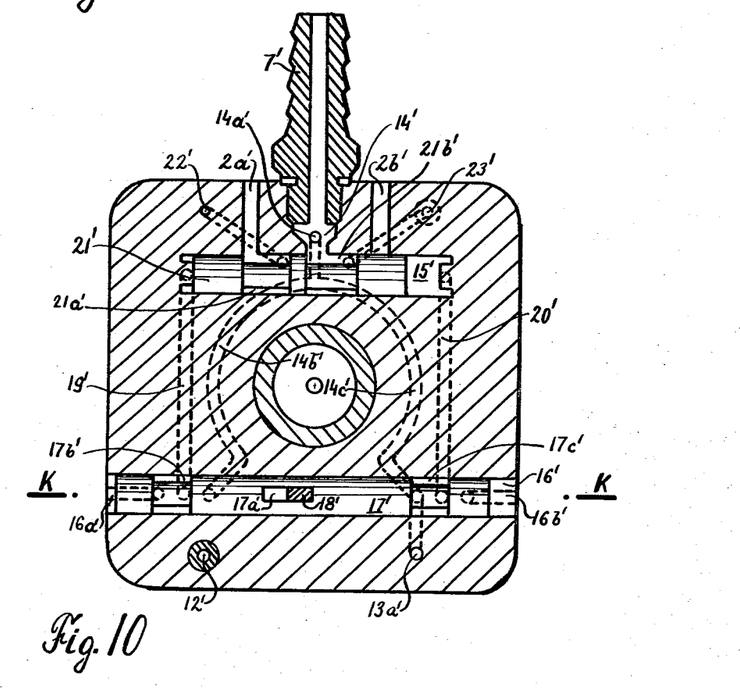
FIG. 10 is a transverse section taken along line J—J of FIG. 7.

The intermediate transverse wall of the body 2' is formed with an inlet passage 14' communicating through a conduit 7' with a source of compressed air. In addition, as shown in FIGS. 7 and 10, the intermediate wall of the body 2' is formed with a pair of discharge openings 2a' and 2b' communicating with the outer atmosphere and through which the air under pressure can escape. The head end member 6' is formed with the discharge conduit 10' through which the high pressure liquid flows through a conduit 8' to the device which is to be supplied with the liquid at high pressure.

Figure 9:
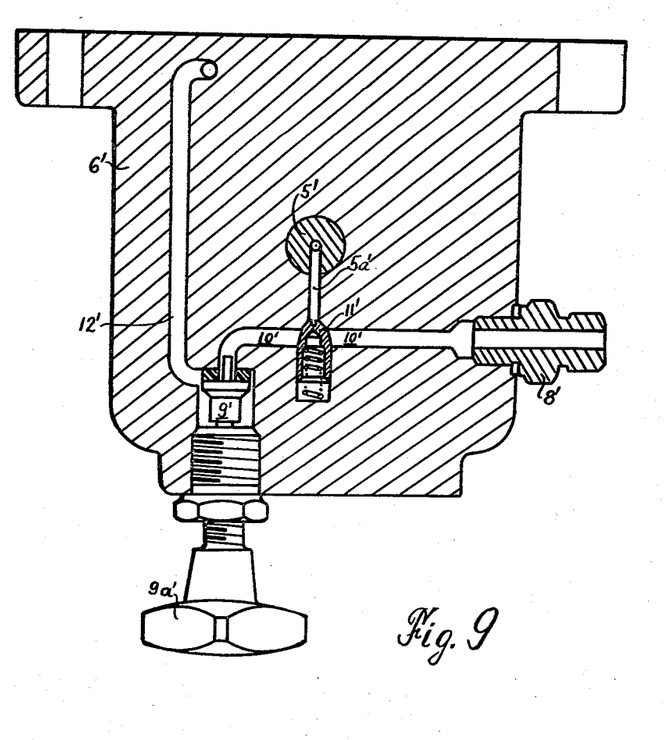
FIG. 9 is a transverse section of the structure of FIG. 7 taken along line H—H of FIG. 7.

As shown in FIG. 9, the non-return valve 11' communicates with the discharge conduit 10' upstream of the conduit 8' and downstream of the unloading valve 9' which is capable of being actuated by handle 9a'. The unloading valve 9' is actuated by handle 9a'. The unloading valve 9' is actuated so as to direct the liquid under pressure out of the discharge conduit 10', instead of through the latter to the device which is to be supplied with the hydraulic liquid. When the valve 9' is thus manually opened the liquid under pressure will flow, from a region in the conduit 10' upstream of valve 11', into the passage 12' (FIG. 9) and from the latter back into the reservoir 13' of hydraulic liquid, this reservoir being carried by the bottom end of the structure, as indicated in FIG. 7.

From the inlet conduit 7' for the actuating air which is under pressure, this air reaches the inlet passage 14' which communicates with the cylindrical chamber 15' (FIG. 10) and which also communicates with a branch 14a' having a pair of arms or additional branches 14b' and 14c', both of which communicate with the cylindrical chamber 16' formed in the intermediate wall of the body 2', as shown in FIG. 10. A secondary slide valve means 17' is slidable in the chamber 16' and is formed with an opening 17a' which receives a reversing means 18' in the form of an elongated camming member having inclined camming surfaces (FIG. 11) acting in the manner of wedges so as to automatically shift the secondary slide valve means 17' in response to movement of the low pressure piston means 3a', 3b' to the ends of its strokes. Thus, as is shown in FIG. 8, when the low pressure piston means reaches the end of its downward stroke, the upper piston 3a' will engage the reversing means 18' to shift the latter downwardly, while when the low pressure piston means reaches the end of its upward stroke the lower piston 3b' will engage the reversing means 18' to shift the latter upwardly. The upper arm of the reversing cam 18' extends into the upper chamber 1a' beneath the upper piston 3a', while the lower arm of the reversing means 18' extends into the lower chamber 1b' above the lower piston 3b'.

Figure 11:
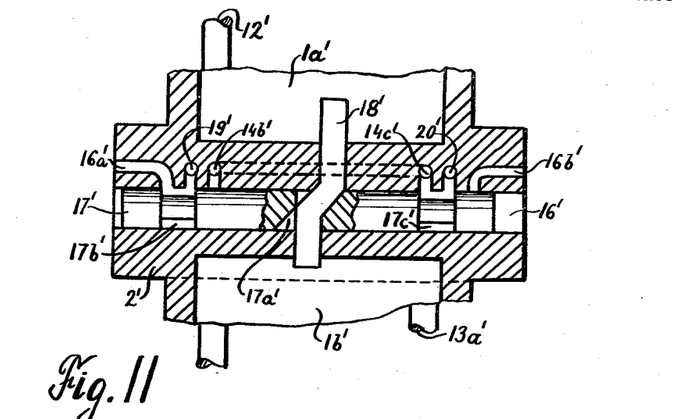
FIG. 11 is a fragmentary longitudinal section taken along line K—K of FIG. 10.

The left end of the chamber 15', as viewed in FIG. 10, communicates through a passage 19', formed in the intermediate transverse wall of the body 2', with the chamber 16' at a location where this passage 19' communicates with the elongated annular groove 17b' formed in a secondary slide valve 17. The right end of the chamber 15' communicates through a passage 20' with the elongated annular groove 17c' which is formed in the slide valve 17'. The body 2' is formed with discharge passages 16a' and 16b' communicating with the outer atmosphere and with the chamber 16 in the region of its opposite ends, as shown in FIG. 10, so that when the valve 17' is in its left position shown in FIG. 10 the passage 19' will communicate through the passage 16a' with the outer atmosphere while the passage 16b' is closed, and in the right position of the valve 17' the passage 16b' will provide communication between the passage 20' and the outer atmosphere while the passage 16a' will be closed by the left end of the slide valve 17'. These discharge passages are also shown in FIG. 11.

The primary slide-valve means 21' is shiftable in the cylindrical chamber 15' and of course communicates at its ends through the passages 19' and 20' with the secondary valve means 17' so as to be actuated by the latter. A passage 22' also communicates with the chamber 15' and serves for filling and emptying the lower part of the upper cylinder portion 1a' (FIG. 7). This passage 22' also serves to fill and empty the lower part of the lower cylinder chamber 1b' beneath the piston 3b'. Another passage 23' communicates with the chamber 15' and serves, as indicated in FIG. 7, to fill and empty the upper part of the uper chamber 1a' above the piston 3a' as well as the upper part of the lower chamber 1b' above the lower piston 3b'. The passages 22' and 23' respectively communicate with the elongated annular grooves 21a' and 21b' formed in the primary slide valve 21'. Through these elongated annular grooves 21a' and 21b' of the slide valve 21', the passages 22' and 23' are alternately placed in communication either with the supply passage 14' for the actuating air under pressure or with the discharge passages 2a' and 2b', respectively, which lead to the outer atmosphere, as shown in FIG. 10.

As is shown most clearly in FIG. 8, the lower piston 3b' carries a non-return valve 24' at the lower end of the high pressure chamber 4', and it is through this non-return valve 24' that the hydraulic liquid flows from the container or reservoir 13' through a tube 13b' and into a supply tube 13c' fixed to the piston 3b' for movement therewith and providing a passage from the tank 13' to the non-return valve 24'. The tube 13c' reciprocates with clearance in the tube 13b' and is slidably surrounded in a fluid-tight manner by a lower wall of the body 2' which carries the reservoir 13' and which closes the bottom end of the chamber 1b' in which the piston 3b' reciprocates. In this way the liquid under pressure can reach the lower part of the hydraulic chamber 4' in the interior of the piston rod portion 3'.

Another non-return valve 25' is carried by the high pressure piston 5' and serves to admit the high pressure liquid from the lower part of the hydraulic cylinder 4' into the upper part thereof through the branches 5b' which communicate with the passage 5a' formed in the high pressure means 5'. This high pressure piston means is again fixedly carried by the head member 6' and passage 5a' leads to the non-return valve 11' as well as to the discharge passage 10' which is controlled by the non-return valve 11'. The branch passages 5b' of the non-return valve 25' of course intersect the passage 5a' and provide communication between the latter and the upper part of the hydraulic chamber 4'.

This embodiment of the invention operates in the following manner:

The air under pressure which enters through the inlet 7' reaches the entrance passage 14' and will flow from the latter into the elongated groove 21a' of the primary slide valve 21' when the slide valve is displaced to the right from its position shown in FIG. 10. The air under pressure will now flow through the passage 22' into the lower part of the upper cylinder portion 1a' beneath the upper piston 3a' and into the lower part of the lower cylinder portion 1b' beneath the lower piston 3b', so that the low-pressure piston means is now driven upwardly. The upwardly moving pneumatic piston means 3a', 3b' will now discharge air from the upper part of the cylinder portion 1a', from above the piston 3a' and from the upper part of the lower cylinder portion 1b' above the piston 3b' into the passage 23' from where this air will flow into the elongated annular groove 21b' of the primary slide valve 21' in the cylindrical chamber 15' and out of the latter to the outer atmosphere through the discharge passage 2b'.

The upward movement of the pair of pneumatic pistons 3a', 3b' causes the lower piston 3b' to engage the reversing means 18' and shift the latter upwardly so that when the pnumatic piston means 3a', 3b' has reached the end of its upward stroke, the reversing means 18' will, by its inclined camming surfaces, have shifted the secondary slide valve 17' to the position thereof shown in FIGS. 10 and 11. As a result the elongated annular groove 17c' is displaced into a position where the air in the branch 14c', which communicates through the branch 14a' with the entrance passage 14' for the air under pressure, can flow into the passage 20' so as to reach in this way the right end of the chamber 15' and thus supply the air under pressure to the right end of the primary slide valve 21' to shift the latter to the left into the position shown in FIG. 10. At the same time the elongated annular groove 17b' of the secondary slide valve 17' has been displaced into a position where the air flowing out of the left end of the chamber 15' can communicate through the passage 19' with the discharge 16a' to the outer atmosphere.

This shifting of the primary slide valve 21' to its left position, as viewed in FIG. 10, results, on the one hand, in the termination of the flow of air under pressure into the lower portion of the upper cylinder 1a' beneath the piston 3a' and into the lower portion of the lower cylinder 1b' beneath the piston 3b', after interruption of the communication between the passage 14' and the passage 22' which leads to the above-mentioned lower portions of the cylinders 1a' and 1b'. On the other hand, the shifting of the primary slide valve to its left position shown in FIG.

10 provides admision of air under pressure through the passage 23′ into the upper part of the upper cylinder 1a′ above the piston 3a′ as well as into the upper part of the lower cylinder 1b′ above the piston 3b′, so that now the pneumatic piston 3a′, 3b′ is driven downwardly, and all of the movable parts of the apparatus have their direction of movement reversed, while all of the connections are reversed in the pneumatic circuit (for example, air is supplied through the elongated groove 21b′ rather than 21a′, discharge takes place from chamber 15′ through passage 19′ rather than 20′, etc.).

The downward movement of the pneumatic piston 3a′, 3b′ provides automatic opening of the non-return valve 24′ by the liquid under pressure (although at the beginning of the operation it may be air under pressure which opens the non-return valve 24′), and thus the lower part of the hydraulic cylinder chamber 4′ is opened, and the liquid flows out of the reservoir 13′ through the tubes 13b′ and 13c′ into the lower interior portion of the chamber 4′ in the interior of the hollow piston rod 3′. The entrance of the liquid under pressure into the chamber 4′ accelerates the flow of air under pressure through the passage 13a′ (FIG. 8) into the container 13′ above the liquid therein, this passage 13a′ being at all times in communication with the branch 14c′, as is shown at the lower right portion of FIG. 10. Through this branch 14c′ the passage 13a′ communicates with the branch 14a′ and the branch 14′ for discharge of this air above the liquid in the tank 13′. The lower part of the hydraulic cylinder chamber 4′ is in this way completely filled with liquid. On the other hand, in the upper part of the chamber 4′, as a result of the approach of the upper end thereof to the larger diameter, free end portion of the piston 5′, there is an increase in the liquid pressure which results in closing of the non-return valve 25′, so as to hold the latter closed, and now the liquid under pressure flows through the passages 5b′ and along the passage 5a′, opening the non-return valve 11′ in the discharge conduit 10′ so that the liquid under pressure now flows out through the conduit 8′ to the device which is to be actuated by the hydraulic liquid under pressure. As soon as the return movement of the pneumatic piston 3a′, 3b′ in an upward direction again begins, the lower end of the chamber 4′ which now approaches the piston 5′ increases the pressure of the liquid in the lower portion of the cylinder 4′ so that the non-return valve 24′ closes. As a result the non-return valve 25′ opens and part of the liquid under pressure, which was located in the lower portion of the chamber 4′ and which is now at high pressure, begins to flow through the passage 5a′ to the non-return valve 11′ which automatically opens permitting the liquid under pressure to flow along the discharge conduit 10′ downstream of the valve 11′, while another part of this liquid under pressure flows through the passages 5b′ into the upper part of the hydraulic chamber 4′.

As long as the pneumatic piston means 3a′, 3b′ moves upwardly at the beginning of the operation of the multiplier and there is in the discharge conduit 10′ a lower pressure than in the container 13′, all three non-return valves 24′, 25′ and 11′ open simultaneously, so that there is a very rapid prefilling of the entire hydraulic circuit with the low-pressure liquid. This circuit includes the passages 5a′ and 5b′, the discharge conduit 10′ and all of the communicating hydraulic components.

When the upward stroke of the piston means 3a′, 3b′ terminates and the return movement in the downward direction begins, there is a momentary drop in pressure of extremely short duration in the passage 5a′, so that the non-return valve 11′ closes, and thus a drop in the pressure of the liquid in the discharge conduit 10′ is prevented. Immediately thereafter, however, the fluid pressure increases in the upper part of the hydraulic chamber 4′ very rapidly, so that the non-return valve 25′ again closes and the high pressure spreads itself again through the passages 5b′ out of the upper part of the chamber 4′ into the passage 5a′, so that the non-return valve 11′ again opens and the supply of high pressure liquid through the discharge conduit 10′ continues. At each subsequent reversal in the direction of movement of the pneumatic piston 3a′, 3b′, there will be the above-mentioned momentary, transitional drop in the liquid pressure in the passage 5a′, so that there will be a momentary closing of the valve 11′ during this transition period of extremely short duration.

During the continued movement of the piston 3a′, 3b′ downwardly, when all of the hydraulic chambers of the system have been filled with the liquid under pressure, there is, as a result of the increase in volume of the lower portion of the hydraulic cylinder chamber 4′, a drop in the pressure of the liquid in this lower portion of the chamber 4′ and as a result there is also a closing of the non-return valve 25′ as well as an opening of the non-return valve 24′, through which the hydraulic liquid then flows out of the reservoir 13′ through the tubes 13b′ and 13c′ into the lower part of the cylindrical chamber 4′, the liquid at this time being sucked into this latter lower part of the chamber 4′ until the end of the downward movement of the low-pressure piston means 3a′, 3b′.

When the pressure in the interior of the discharge conduit 10′ has reached the predetermined elevation required for operation of the device with which the apparatus of the invention is connected, there is a balance of pressures on both sides of the non-return valve 11′, so that the actuation of the multiplier automatically stops. When high pressure in the discharge conduit 10′ and thus in the hydraulic device, such as a workpiece holder, is no longer necessary, the high pressure liquid is taken out of the conduit 10′ through the passage 12′ and is delivered back into the container 13′, by the manual opening of the unloading valve 9′, the operator actuating the handle 9a′ for this purpose. In the event that the supply of air under pressure to the inlet conduit 7′ still continues under these conditions, the actuation of the multiplier in the above-described manner continues, and this operation will take place until after closing of the unloading valve 9′ the pressure in the discharge conduit 10′ again reaches the predetermined value which is regulated by adjusting the pressure of the air admitted to the apparatus to a proper value.

One of the primary advantages achieved with the invention is the extremely rapid pressure operation in the low pressure circuit, not only in its liquid part but also in the air part thereof, this pressure operation being of short enough duration to bring about operation of the apparatus by way of a single stroke of the pneumatic piston. Thus, there is an immediate achievement of a high pressure liquid in the hydraulic circuit as well as in all parts of the operating components. The small size of the components of the entire device together with the arrangement of the non-return valves, which serve to maintain, in a very reliable manner, the high pressure in the high pressure circuit during the pressure drop in the low pressure circuit, and together with the above-mentioned almost immediate effective operation of the apparatus of the invention is extremely important and gives to the invention the possibility of a wide variety of uses, such as, for example, in aircraft, automobiles, and other types of machines in industry, etc.

I claim:
1. In a hydraulic pressure-multiplier, a stationary, hollow low-pressure cylinder means defining in its interior a low-pressure chamber, low-pressure piston means slidably supported in said low-pressure cylinder means for reciprocation therein, said low-pressure piston means being double-acting and having a hollow interior defining a high-pressure chamber, and stationary, double-acting high-pressure piston means fixedly carried by said low-pressure cylinder means and slidably received in said hollow low-pressure piston means in the interior of said high-pressure chamber formed therein.

2. The combination of claim 1 and wherein said high-pressure piston means is formed with a passage for conducting high-pressure liquid, said passage leading to a device for using the high-pressure liquid, non-return valve means in said passage for providing flow of high-pressure liquid from said passage to the device but preventing the reverse flow, second non-return valve means communicating with the interior of said high-pressure chamber in said low-pressure piston means and admitting high-pressure fluid from said high-pressure chamber in said low-pressure piston means into said passage of said high-pressure piston means but preventing the reverse flow of fluid, and third non-return valve means communicating with said low-pressure chamber of said stationary low pressure cylinder means and carried by said double-acting low-pressure piston means for admitting fluid from said low-pressure chamber to said high-pressure chamber but preventing the reverse flow of the fluid.

3. The combination of claim 2 and wherein a conduit means communicates with said low-pressure chamber defined in said stationary low-pressure cylinder means adjacent opposite ends thereof for directing low-pressure fluid alternately into the opposite ends of said low-pressure chamber to reciprocate said double-acting low-pressure piston means therein, a primary slide valve means coacting with said conduit means for controlling the flow of low-pressure fluid therethrough alternately to the opposite ends of said low-pressure chamber, secondary slide valve means communicating with said primary slide valve means for reciprocating the latter to control the flow of fluid through said conduit means, and reversing means operatively connected with said secondary slide valve means and actuated by said low-pressure piston means as the latter reaches ends of its strokes for automatically responding to movement of said low-pressure piston means for reversing the position of said secondary slide valve means and thus controlling said primary slide valve means.

4. The combination of claim 3 and wherein said reversing means is in the form of a turnable lever having one end connected with said secondary slide valve means, said low pressure piston means being formed at its exterior between its ends with a recess receiving an end of said lever distant from said secondary slide valve means so that portions of said low pressure piston means will engage and turn said lever for reversing the position of said secondary slide valve means.

5. The combination of claim 3 and wherein said reversing means is in the form of a longitudinally shiftable cam extending through and beyond said secondary slide valve means for shifting the latter in one direction when said cam is displaced in one direction substantially parallel to the axis of said low pressure piston means and for shifting said secondary slide valve means in an opposite direction when said cam is shifted in an opposite direction substantially parallel to the axis of said low-pressure piston means, said low-pressure piston means having an intermediate portion of reduced diameter as compared to opposed end portions thereof, and a wall surrounding and guiding said intermediate portion of smaller diameter of said low-pressure piston means, said wall carrying said cam and said secondary slide valve means and said cam having opposed ends respectively extending beyond said wall to be engaged by portions of said low pressure piston means respectively situated on opposite sides of said wall and being of a larger diameter than said intermediate portion of reduced diameter, whereby said cam is automatically shifted by said low-pressure piston means to displace said secondary slide valve means between its positions.

6. The combination of claim 1 and wherein said low pressure cylinder has in its interior at its opposite ends effective areas of different sizes, the smaller of which is equal to the larger minus the cross-sectional area of said fixed high-pressure piston means in the region of the end of said low-pressure cylinder means of smaller effective area, said high-pressure piston means having distant from said end of smaller effective area of said low pressure cylinder an enlarged piston portion slidably engaging said low pressure piston means in its interior portion which defines said high-pressure chamber, and the ratio of the effective area of larger size of said low pressure cylinder means to the cross-sectional area of said high-pressure piston means in the region of the end of said low pressure cylinder means which is of smaller effective area being substantially equal to the ratio between the smaller effective area of said low pressure cylinder means to the effective area of said high pressure chamber in the interior of said low pressure piston means.

7. The combination of claim 6 and wherein said ratio is maintained within 10%.

8. The combination of claim 6 and wherein said low and high pressure chambers have annular surface portions surrounding the portion of said fixed, high-pressure piston means which is of smaller diameter and said annular portions having equal inner circular configurations, which coincide with and surround said high pressure piston means at its portion of smaller diameter, said annular surface portions respectively having outer circular configurations of the same size as outer circular configurations of said low and high pressure chambers at their ends which are of larger effective area.

9. The combination of claim 1 and wherein the high pressure chamber in the interior of said low pressure piston means and said high-pressure piston means form part of a hydraulic circuit, while the interior of said low pressure chamber defined in said low pressure cylinder means together with the exterior surface of said low pressure piston means define part of a pneumatic circuit.

10. The combination of claim 9 and wherein said low pressure piston means has an intermediate portion of a reduced diameter as compared to its end portions, said low pressure cylinder means having an intermediate transverse wall formed with an opening through which said portion of reduced diameter of said low pressure piston means slidably extends and said high pressure piston means being situated on one side of said intermediate wall in one cylinder portion of said low pressure cylinder means, the sum of the effective cross-sectional areas of the interiors of said portions of said low pressure cylinder means adjacent said intermediate wall in said one cylinder portion and distant therefrom in the other cylinder portion having with respect to the cross-sectional area of a portion of said high pressure piston means distant from said intermediate wall a ratio which is substantially equal to the ratio of the sum of the effective cross-sectional areas of said interior low-pressure cylinder portions respectively distant from said intermediate wall in said one cylinder portion and adjacent said intermediate wall in the other of said cylinder portions to the inner cross-sectional area of said low-pressure piston means at a portion thereof distant from said intermediate wall and surrounding said high-pressure piston means, said latter portion of the interior of said low pressure piston means and the portion of said one cylinder portion which surrounds said high pressure piston means both having annular configurations limited along their inner peripheries by circles which surround and engage said high pressure piston means and limited at their outer peripheries by circles of the same size as and aligned with circular cross-sectional areas of the other of said cylinder portions and the largest interior portion of said low pressure piston means, said ratios being equal to within 10%.

No references cited.

MARTIN P. SCHWADRON, *Primary Examiner.*

R. R. BUNEVICH, *Assistant Examiner.*